(12) United States Patent
Fon

(10) Patent No.: US 12,738,965 B2
(45) Date of Patent: Sep. 15, 2026

(54) DEVICE AND METHOD FOR REGULATING VOLTAGE SWING ACROSS AN ANTENNA OF A NEAR-FIELD COMMUNICATIONS DEVICE

(71) Applicant: Nordic Semiconductor ASA, Trondheim (NO)

(72) Inventor: Henrik Fon, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 325 days.

(21) Appl. No.: 18/576,709

(22) PCT Filed: Jul. 5, 2022

(86) PCT No.: PCT/NO2022/050166
§ 371 (c)(1),
(2) Date: Jan. 4, 2024

(87) PCT Pub. No.: WO2023/282767
PCT Pub. Date: Jan. 12, 2023

(65) Prior Publication Data

US 2024/0259040 A1 Aug. 1, 2024

(30) Foreign Application Priority Data

Jul. 6, 2021 (GB) ..................................... 2109744

(51) Int. Cl.
*H04B 1/16* (2006.01)
*H04B 1/04* (2006.01)
(Continued)

(52) U.S. Cl.
CPC ............. *H04B 1/1607* (2013.01); *H04B 1/04* (2013.01); *H04B 5/266* (2024.01); *H04B 5/43* (2024.01); *H04B 5/45* (2024.01)

(58) Field of Classification Search
CPC .......... H04B 1/1607; H04B 5/00; H04B 5/22; H04B 5/26
See application file for complete search history.

(56) References Cited

U.S. PATENT DOCUMENTS 9,026,046 B2 * 5/2015 Lefley ....................... H02J 7/02 455/41.1
9,762,292 B2 * 9/2017 Manian .................... H04B 5/79
(Continued)

FOREIGN PATENT DOCUMENTS

WO WO 2017166365 A1 10/2017
WO WO 2018100369 A1 6/2018

OTHER PUBLICATIONS

International Search Report and Written Opinion for PCT/NO2022/050166, mailed Sep. 27, 2022, 12 pages.
(Continued)

*Primary Examiner* — William G Trost, IV
(74) *Attorney, Agent, or Firm* — Klarquist Sparkman, LLP

(57) ABSTRACT

An electronic device for processing near-field communication signals includes first and second antenna connection terminals for connection to a near-field antenna, a linear load and a voltage clamp, each connected between said connection terminals. A current flowing through the linear load has a substantially linear, positive relationship with a voltage across the linear load, defining a conductance of the linear load. The conductance of the linear load is adjustable. The voltage clamp has an adjustable clamping voltage. The electronic device also includes a peak detector arranged to detect an amplitude of an incoming near-field communication signal across said antenna connection terminals, and a control circuit arranged to adjust the conductance of the linear load and the clamping voltage of the voltage clamp
(Continued)

based on the amplitude detected by the peak detector, so as to regulate the voltage swing across the antenna connection terminals.

15 Claims, 5 Drawing Sheets

(51) Int. Cl.

| | |
|---|---|
| ***H04B 5/26*** | (2024.01) |
| ***H04B 5/43*** | (2024.01) |
| *H04B 5/45* | (2024.01) |

(56) References Cited

U.S. PATENT DOCUMENTS

| | | | | |
|---|---|---|---|---|
| 10,979,102 | B2 * | 4/2021 | Balasubramanian .... | H04B 5/26 |
| 2012/0300350 | A1 | 11/2012 | Nguyen et al. | |
| 2015/0004909 | A1 | 1/2015 | Agrawal et al. | |
| 2016/0087430 | A1 | 3/2016 | Sheikholeslami | |
| 2017/0353029 | A1 | 12/2017 | Austad et al. | |
| 2018/0262002 | A1 | 9/2018 | Tramoni | |
| 2019/0326956 | A1 | 10/2019 | Balasubramanian | |

OTHER PUBLICATIONS

IPO Combined Search and Examination Report under Sections 17 and 18(3), dated May 10, 2022, 13 pages.

* cited by examiner

DEVICE AND METHOD FOR REGULATING VOLTAGE SWING ACROSS AN ANTENNA OF A NEAR-FIELD COMMUNICATIONS DEVICE

CROSS REFERENCE TO RELATED APPLICATIONS

This is the U.S. National Stage of International Application No. PCT/NO2022/050166, filed Jul. 5, 2022, which was published in English under PCT Article 21(2), which in turn claims the benefit of Great Britain Application No. 2109744.9, filed Jul. 6, 2021.

TECHNICAL FIELD

The present invention relates to near-field communication (NFC), particularly to a device and method for regulating the voltage swing across the antenna of an NFC receiver.

BACKGROUND OF THE INVENTION

Near-field communication (NFC) provides a method of short-range communication between devices when they are brought into close proximity to one another, usually of the order of ten centimetres or less. An NFC-capable device normally comprises a small loop antenna connected to an integrated circuit within the device and provides the device with the capability to communicate over short ranges using magnetic induction. NFC connectivity has become increasingly popular in recent times in mobile devices for short range communication.

Typically, NFC communications are between a transmitter or "Poller" device and a receiver or "Listener" device, at least one of which is usually portable. When they are in operative range, the Poller and Listener devices are located within each other's respective electromagnetic near-field regions, such that the two devices form an air-core transformer due to their mutual inductance. The Poller device applies an alternating voltage across its loop antenna which establishes a magnetic field that is received by the Listener device and converted back to a voltage. NFC communications usually employ the unlicensed radio frequency industrial, scientific and medical (ISM) band of 13.56 MHz and are modulated using one of a number of techniques known in the art such as amplitude shift keying (ASK) wherein the voltage level may alternate between a minimum and a maximum voltage level to represent a digital 0 and 1 respectively.

As long as the Listener device is sufficiently close to the Poller device, the Listener should receive commands sent by the Poller. However, the range of voltages or "voltage swing" across the loop antenna of the Listener can vary dramatically depending on a number of factors such as the distance between the Poller and the Listener, the strength of the field established by the Poller, and the mutual inductance between the two devices. It is important to regulate the voltage swing across the loop antenna of the Listener in order to ensure that the voltage swing is not too small such that the incoming signals cannot be demodulated effectively but also not too large such that the circuitry could be damaged. This limiting is particularly important in CMOS technology nodes with small feature size. In such technology nodes, the devices can withstand relatively low voltages.

It is known to use a voltage clamp to clamp the voltage swing of the Listener device to a safe limit. A voltage clamp is a non-linear device, having a non-linear relationship between the voltage across the device and the current flowing through the device. The clamping voltage of the device defines the voltage above which the device begins to sink large amounts of current to prevent further increases in voltage. The clamping voltage in a given device can exhibit high process and temperature variations. In order to take account of this, a relatively conservative nominal value must be chosen which can limit the maximum swing available in the system. This is undesirable for modulation, which is improved by having as large voltage swing as possible within safe limits.

The non-linear relationship of such devices is also undesirable for demodulation since impedance increases very fast when voltage swing goes down, thus lowering the bandwidth of the Listener device below the requirements.

The present invention seeks to provide an improved device and method for regulating the voltage swing across the antenna of a near-field communications device which addresses at least some of these shortcomings.

SUMMARY OF THE INVENTION

From a first aspect, the invention provides an electronic device for processing near-field communication signals, the electronic device comprising:

- first and second antenna connection terminals for connection to a near-field antenna;
- a linear load connected between said first and second antenna connection terminals, wherein a current flowing through the linear load has a substantially linear, positive relationship with a voltage across the linear load, defining a conductance of the linear load, wherein the conductance of the linear load is adjustable;
- a voltage clamp connected between said first and second antenna connection terminals, having an adjustable clamping voltage;
- a peak detector arranged to detect an amplitude of an incoming near-field communication signal across said antenna connection terminals; and
- a control circuit arranged to adjust the conductance of the linear load and the clamping voltage of the voltage clamp based on the amplitude detected by the peak detector, so as to regulate the voltage swing across the antenna connection terminals.

The invention extends to a method of regulating voltage swing across an antenna of an electronic device receiving near-field communication signals, the method comprising:

- detecting an amplitude of an incoming near-field communication signal across said antenna;
- based on the detected amplitude:
  - adjusting a conductance of a linear load connected between said first and second antenna connection terminals, said conductance providing a substantially linear, positive relationship between a current flowing through the linear load and a voltage across the linear load; and
  - adjusting a clamping voltage of a voltage clamp connected between said first and second antenna connection terminals;
- so as to regulate the voltage swing across the antenna connection terminals.

It will be understood by those skilled in the art that a voltage clamp is a device designed to prevent the voltage swing from rising substantially above the clamping voltage by sinking increasing amounts of current as the voltage across it rises above this clamping voltage. Thus the voltage clamp is a non-linear device, which defines a non-linear relationship between the current flowing through the device and the voltage across the device, such that above the clamping voltage the current increases sharply as the voltage increases.

It will furthermore be understood that the conductance of the linear load defines a ratio between the current through the linear load and a voltage across the linear load, i.e. conductance=current/voltage, thus conductance refers to the inverse of impedance.

It will further be understood that the total voltage swing across the antenna connection terminals is therefore inversely proportional to the total conductance provided that the current is approximately constant—i.e. to the sum of the conductance of the voltage clamp and the conductance of the linear load, since they are connected in parallel. The current will be approximately constant as long as the field generated by the Poller is constant, and the distance and/or orientation between the coils does not change.

Thus it will be seen that, in accordance with the invention, by including in the device both a linear load with an adjustable conductance and a voltage clamp with an adjustable clamping voltage, the conductance and clamping voltage can each be adjusted independently so as to provide an advantageous balance between protecting the electronic device and achieving advantageous modulation and demodulation characteristics. Protection of the electronic device is particularly important for Listener devices using small scale CMOS nodes, which can only withstand even lower voltages than larger devices. Protection of the electronic device is ensured by the voltage clamp, but having the clamping voltage adjustable allows the linear load to be used instead, where possible. This allows the current-voltage (IV) characteristics to be as linear as possible which is desirable for demodulation.

In some embodiments the voltage swing across the antenna connection terminals is regulated whilst maximising the clamping voltage of the voltage clamp. Maximising the clamping voltage of the voltage clamp allows the voltage swing to be as high as possible. Meanwhile, the voltage swing across the antenna connection terminals may be regulated largely (or entirely) by adjusting (e.g. increasing) the conductance of the linear load, thus preventing the voltage swing from exceeding a safe level, whilst still providing the linear behaviour which is desirable for demodulation. Thus, in some embodiments, the regulation is such that the conductance of the linear load tends to be increased over time, and also the clamping voltage tends to be increased. The conductance of the linear load may also be considered as being "maximised", but in the sense that the conductance of the linear load is increased until a steady state value of the voltage swing is reached, i.e. rather than when the maximum possible conductance value is reached, so that the conductance of the linear load compensates for the reduction in conductance provided by the voltage clamp as much as possible, allowing the clamping voltage to be maximised.

Regulating the voltage swing across the antenna connection terminals will typically imply maintaining the voltage swing below a predetermined safe threshold value.

In some embodiments, the control circuit is arranged to adjust the conductance of the linear load from a first minimum value, towards a first maximum value. Similarly in some embodiments of the method, adjusting the conductance of the linear load comprises adjusting the conductance of the linear load from a first minimum value, towards a first maximum value. This is advantageous since the increasing conductance provided by the linear load over time allows the voltage swing to remain at high, but safe, values when the clamping voltage is increased. This improves modulation performance since it provides a greater amplitude for load modulation for the Poller device. It will be understood that adjusting the conductance towards a maximum value does not require that the conductance be increased at a regular rate, nor even that it is always increased. Furthermore, the conductance need not ever reach the first maximum value, but rather it is controlled to tend towards this first maximum value, and to reach a value as close to this first maximum value as possible whilst still achieving a desirable voltage swing.

The control circuit is arranged so as to regulate the voltage swing across the antenna connection terminals whilst maximising the clamping voltage of the voltage clamp, and further in some embodiments, whilst also maximising the conductance of the linear load. It will be understood that by "maximising" it is meant that the clamping voltage is increased to the largest possible value which still achieves regulation of the voltage swing in view of the regulation provided by the linear load.

In some embodiments, the control circuit is arranged to adjust the clamping voltage of the voltage clamp from a second minimum value, towards a second maximum value. Similarly, in some embodiments of the method, adjusting the clamping voltage comprises adjusting the clamping voltage of the voltage clamp from a second minimum value, towards a second maximum value. This behaviour is advantageous, since the clamping voltage begins at a minimum value, before and during "wake-up" of the electronic device, therefore clamping, or limiting, the voltage swing to a low value in order to protect the device at a time when the voltage swing could be very large due to the sudden appearance of a large magnetic field close to the electronic device. Furthermore, the reduction of the clamping voltage over time improves the demodulation performance of the electronic device. It will be understood that the voltage clamp is non-linear, i.e. the relationship between current flowing through the load and the voltage across the load is not linear. It will furthermore be understood that below the clamping voltage, the conductance of the voltage clamp drops very rapidly (e.g. by a factor of 1000), such that the current is minimal and the voltage clamp is essentially (although not quite) non-conductive. By increasing the clamping voltage above which the voltage clamp provides this non-linear relationship, this therefore raises the threshold below which the behaviour of the electronic device is linear because regulation is instead provided by the linear load. This linear relationship improves demodulation performance.

It will again be understood that adjusting the clamping voltage towards a maximum value does not require that the threshold voltage be increased at a regular rate, nor even that it is always increased. Furthermore, the clamping voltage need not ever reach the second maximum value, but rather it is controlled to tend towards this second maximum value, and to reach the clamping voltage as close to this second maximum value as possible whilst still achieving regulation of the voltage swing.

In some embodiments the regulation of the voltage swing across the antenna connection terminals may comprise two distinct phases, first an increasing phase, and then a compensation phase. For example, in the increasing phase the clamping voltage may initially be set to a minimum value (i.e. low impedance, high conductance), and then increased over time until the voltage swing across the antenna connection terminals reaches a defined (e.g. optimum) value.

Thus initially the conductance may essentially all be provided by the voltage clamp, and this conductance may be decreased over time to raise the voltage swing to the defined value.

Then, in the compensation phase, the clamping voltage may continue to be increased (i.e. the impedance of the voltage clamp is increased, i.e. conductance decreases) and the conductance of the linear load increased (i.e. lowering the impedance) so as to keep the overall conductance approximately constant, thus giving an approximately constant voltage swing. It will be understood that this phase can be referred to as "compensation" since the conductance of the clamp voltage is gradually "traded" for the conductance of the linear load, whilst keeping the voltage swing at approximately the defined value.

The combination of these two control methods is particularly advantageous since it optimizes all aspects of the operation of the electronic device, protecting the device well during early stages of operation (i.e. before and during wake-up), whilst also enabling good modulation and demodulation characteristics later during operation.

In some embodiments, the first minimum value, and/or the first maximum value, and/or the second minimum value, and/or the second maximum value are pre-set, e.g. these might be design parameters set by a user during design or set-up.

The electronic device and method regulate the voltage swing across the antenna connection terminals. As explained above, this typically implies maintaining the voltage swing below a predetermined safe threshold value. In some embodiments, the device and method make adjustments so as to keep the voltage swing, as much as possible, between a minimum voltage threshold and a maximum voltage threshold. However, the voltage swing may not always be within the range defined by these thresholds, rather the swing may tend towards being within this range but may sometimes be outside of this range, e.g. during transitions as adjustments are made.

Thus, in some embodiments, the control circuit is arranged to compare the detected amplitude to a maximum voltage threshold and/or to a minimum voltage threshold. Similarly, in some embodiments, the method may further comprise comparing the detected amplitude to a maximum voltage threshold and/or comparing the detected amplitude to a minimum voltage threshold. It will be appreciated by those skilled in the art that the "maximum voltage threshold" defined herein may be set to provide satisfactory operation in given circumstances but need not be the same as the maximum safe voltage for the receiver circuitry. In some embodiments the electronic device further comprises a reference generator, arranged to generate the minimum voltage threshold and/or the maximum voltage threshold. Similarly the method may comprise generating the minimum voltage threshold and/or the maximum voltage threshold. The maximum voltage threshold, and/or the minimum voltage threshold may be pre-set, e.g. these might be design parameters set by a user during design or set-up. The control circuit may be arranged to adjust the conductance of the linear load and the clamping voltage of the voltage clamp based on the comparison of the detected amplitude with the maximum voltage threshold and/or the minimum voltage threshold.

In some embodiments the method further comprises:

- if the detected amplitude exceeds the maximum voltage threshold, then:
  - if the conductance of the linear load is below the first maximum value, increasing the conductance;
  - or, if the conductance of the linear load is equal to the first maximum value, then:
    - if the clamping voltage of the voltage clamp is above the second minimum value, decreasing the clamping voltage; and
    - otherwise, not adjusting either the conductance of the linear load or the clamping voltage of the voltage clamp.

Likewise, in some embodiments, the control circuit is arranged to carry out the following steps:

- if the detected amplitude exceeds the maximum voltage threshold, then:
  - if the conductance of the linear load is below the first maximum value, increase the conductance;
  - or, if the conductance of the linear load is equal to the first maximum value, then:
    - if the clamping voltage of the voltage clamp is above the second minimum value, then decrease the clamping voltage; and
    - otherwise, not adjust either the conductance of the linear load or the clamping voltage of the voltage clamp.

In some embodiments the method further comprises:

- if the detected amplitude is below the minimum voltage threshold, then:
  - if the clamping voltage of the voltage clamp is below the second maximum value, increasing the clamping voltage;
  - or, if the clamping voltage is equal to the second maximum value, then:
    - if the conductance of the linear load is above the first minimum value, decreasing the conductance of the linear load; and
    - otherwise, not adjusting either the conductance of the linear load or the clamping voltage of the voltage clamp.

Likewise, in some embodiments, the control circuit is arranged to carry out the following steps:

- if the detected amplitude is below the minimum voltage threshold, then:
  - if the clamping voltage of the voltage clamp is below the second maximum value, then increase the clamping voltage;
  - or, if the clamping voltage is equal to the second maximum value, then:
    - if the conductance of the linear load is above the first minimum value, then decrease the conductance of the linear load; and
    - otherwise, not adjust either the conductance of the linear load or the clamping voltage of the voltage clamp.

In some embodiments the method further comprises:

- if the detected amplitude is above the minimum voltage threshold and below the maximum voltage threshold, increasing the clamping voltage of the voltage clamp. This helps to ensure that over time the voltage clamp is "weakened", as is desirable for the reasons laid out above.

Likewise, in some embodiments, the control circuit is arranged to carry out the following steps:

- if the detected amplitude is above the minimum voltage threshold and below the maximum voltage threshold, increase the clamping voltage of the voltage clamp.

It will be understood that the steps described herein are typically repeated in a cycle by the control circuit to continually regulate the voltage swing. Thus, the method may comprise repeatedly carrying out the various method steps as laid out above. Similarly the control circuit may be arranged to regulate the voltage swing by repeatedly carrying out the steps described above. The method steps described herein above may be repeated rapidly by the electronic device, e.g. a few hundred thousand times a second. This is much faster than the voltage swing across the antenna will normally vary, and therefore allows for good regulation of the voltage swing.

In some embodiments, the linear load may comprise an addressable network of resistors and/or MOS devices. The conductance thereof may be adjusted by varying the number of resistors and/or MOS devices connected within the network, and/or by varying the gate voltage of the MOS devices.

In some embodiments, the voltage clamp comprises a multiplexer and a resistor ladder, wherein the multiplexer receives a control signal from the control circuit, and controls the resistor ladder based on the received control signal. The resistor ladder may generate a resistor ladder voltage which is used to adjust the clamping voltage. In some embodiments, the voltage clamp further comprises at least one NMOS device, wherein the resistor ladder voltage is supplied to the back-gate of the at least one NMOS device.

In some embodiments, adjusting (i.e. increasing or decreasing) the conductance is done in increments e.g. of a pre-defined size. The increments may all be of equal size. Similarly, in some embodiments, adjusting (i.e. increasing or decreasing) the clamping voltage is done in increments e.g. of a pre-defined size. The increments may all be of equal size. By adjusting the conductance and the clamping voltage by incremental amounts at a time, small adjustments can be made to each of these values, so as to vary them gradually over time, without there being a sudden jump in the voltage swing value.

In some embodiments, the electronic device is an NFC-A Listener device. In some embodiments, the incoming near-field communication signal, which the antenna is arranged to detect, is amplitude modulated.

Features of any aspect or embodiment described herein may, wherever appropriate, be applied to any other aspect or embodiment described herein. Where reference is made to different embodiments or sets of embodiments, it should be understood that these are not necessarily distinct but may overlap. It will furthermore be understood that references made to a method comprising a step correspondingly extend to a module "configured to" carry out a step, and vice versa.

BRIEF DESCRIPTION OF THE DRAWINGS

An embodiment of the invention will now be described, by way of example only, with reference to the accompanying drawings, in which.

DETAILED DESCRIPTION

Figure 1:
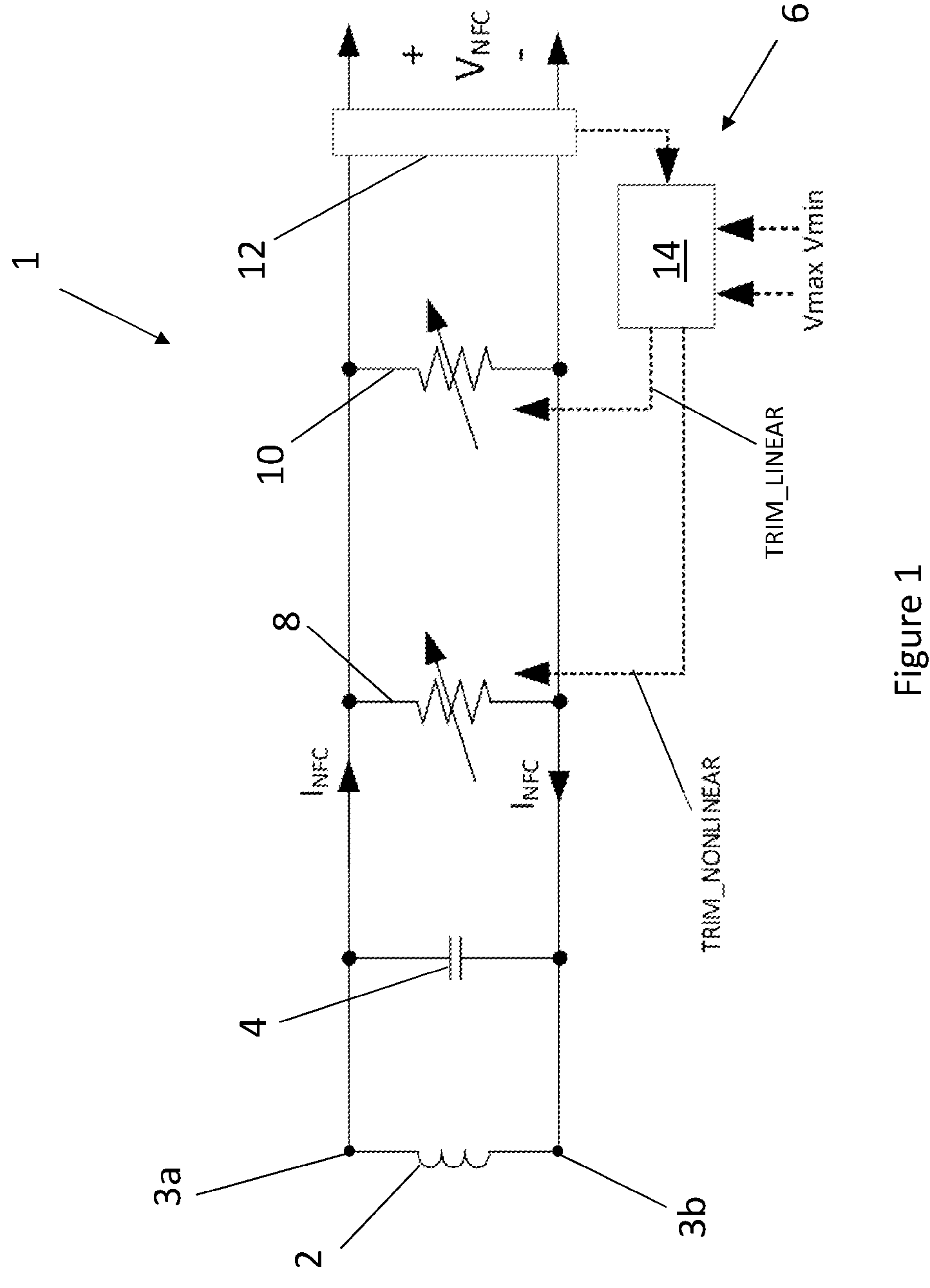
FIG. 1 is a schematic circuit diagram showing an electronic device for regulating the voltage swing across the antenna of an NFC receiver according to an embodiment of the present invention.

FIG. 1 is a schematic circuit diagram showing a device 1 for regulating the voltage swing across the antenna of an NFC receiver according to an embodiment of the present invention. This device is specifically a Listener device.

The Listener device 1 includes first and second antenna connection terminals 3*a*, 3*b* across which an NFC inductor ("antenna") 2 is connected. The Listener device 1 also includes a resonance capacitor 4, connected between the terminals 3*a*, 3*b*, which is to set the resonance frequency at 13.56 MHz.

As described above, the Listener device operates in conjunction with a Poller device, with which it is placed in close proximity. The Poller device applies an alternating voltage across its loop antenna which establishes a magnetic field that is received by the antenna 2 of the Listener device 1 and converted back to a voltage $V_{NFC}$ by means of a generated current $I_{NFC}$. By way of example only, the current $I_{NFC}$ to the Listener device 1 might be in the range 10 mA diff-peak to 80 mA diff-peak during normal operation, and might reach 130 mA diff peak during a stress test.

The "swing", or range of voltages across the antenna 2, of the Listener device needs to be regulated by some kind of regulation loop to keep it within safe levels. Since the loop antenna 2 effectively forms the secondary coil of an air-core transformer with the antenna of an NFC Poller device (where the Poller device's loop antenna forms the primary coil), the current generated that flows through the antenna depends on the mutual inductance between the two NFC devices and so the voltage swing can be reduced by reducing the resistance connected across the antenna connection terminals 3*a*, 3*b* as described below.

For this purpose, the Listener device comprises a voltage swing regulation portion 6. The voltage swing regulation portion 6 includes an adjustable (or "trimmable") voltage clamp 8 (also referred to as an adjustable non-linear device) and an adjustable linear load 10. The voltage clamp 8 and the adjustable linear load 10 are connected in parallel with one another and are connected between the first and second antenna connection terminals 3*a*, 3*b*.

The voltage swing regulation portion 6 further includes a peak detector circuit 12 (e.g. an analog peak detector), a control circuit 14 and a reference generator (not shown).

The peak detector 12 determines the voltage swing $V_{swing}$ of the incoming signal received by the loop antenna 2 and presented at the antenna connection terminals 3*a*, 3*b*. A common mode circuit (not shown) may be present in the electronic device 1 to maintain the common mode signal between the first and second antenna connection terminals 3*a*, 3*b* at half of the supply voltage range, allowing for a symmetric voltage swing about the centre of the supply range (thus providing maximum range both above and below the common mode value).

The voltage swing $V_{swing}$ detected by the peak detector 12 is input to the control circuit 14, as represented by the dashed arrow. The reference generator supplies a maximum threshold voltage, $V_{max}$ and a minimum threshold voltage, $V_{min}$, to the control circuit 14, as represented by the two dashed arrows.

The control circuit 14 generates control signals referred to as "TRIM_NONLINEAR" and "TRIM_LINEAR" for the voltage clamp 8 and the adjustable linear load 10, based on these received signals. The control circuit 14 supplies these control signals, respectively to the voltage clamp 8 and the adjustable linear load 10, as seen in FIG. 1, to control their operation, as described in greater detail below.

Figure 2:
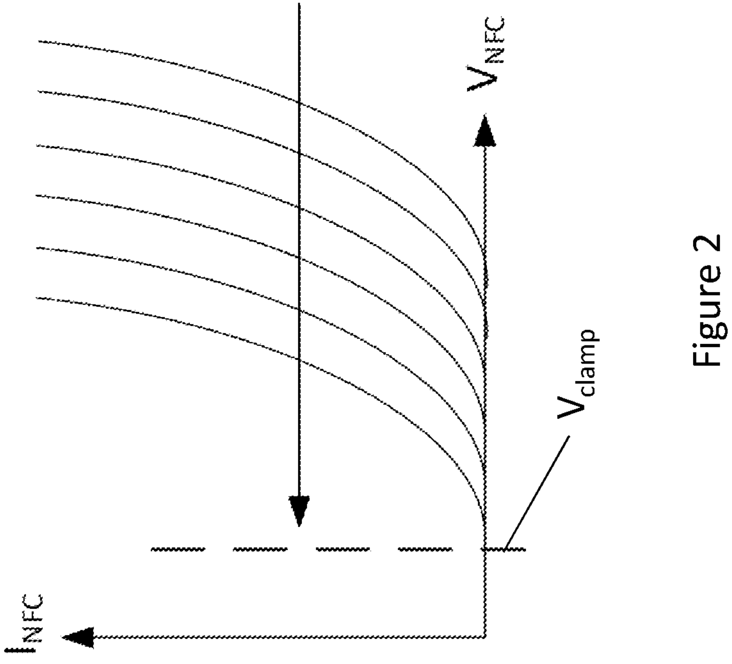
FIG. 2 is a graph representing the relationship between the voltage across the voltage clamp of the device of FIG. 1, and the current through the voltage clamp.

FIG. 2 is a graph representing the relationship between the voltage (V) across the voltage clamp 8 of the device of FIG. 1, and the current (I) through the voltage clamp 8 at various clamping voltage settings. FIG. 2 shows that the voltage clamp is a non-linear device. Below the clamping voltage, e.g. $V_{clmap}$ for the leftmost curve, the voltage clamp draws little or no current. As can be seen, the voltage across the voltage clamp has an almost exponential relationship with the current through the voltage clamp, where the sharp exponential increase in the current begins at the clamping voltage, and the current is almost zero below this value. This means that the current through the voltage clamp will increase rapidly when the voltage goes above the "clamping voltage". This reduces the voltage swing across the device, and thereby protects the other components of the Listener device 1.

The voltage clamp is adjustable, such that the clamping voltage $V_{clamp}$ can be varied. The effect of changing the clamping voltage is to shift the IV curve, as represented by the various curves seen on the graph of FIG. 2, either to the left or the right. A shift to the left represents a reduction in the clamping voltage. The value of $V_{clamp}$ is adjusted by the control circuit 14 supplying a control signal, referred to as a "trim value"-"TRIM_NONLINEAR"- to the voltage clamp. The arrow seen in FIG. 2 represents an increase in the "trim value", therefore an increase in trim value (i.e. moving from the furthest right line on the graph to the line immediately to the left) corresponds to a decrease in clamping voltage, i.e. making the device "stronger" since the voltage is clamped at a lower value.

Figure 3:
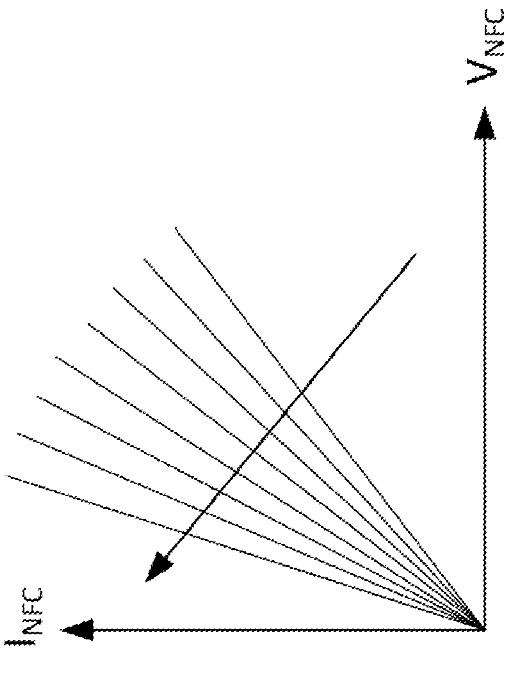
FIG. 3 is a graph representing the relationship between the voltage across the adjustable linear load of the device of FIG. 1, and the current through the adjustable linear load.

FIG. 3 is a graph representing the relationship between the voltage (V) across the adjustable linear load 10 of the device of FIG. 1, and the current (I) through the load 10. FIG. 3 shows that the load 10 is a linear load, such that the ratio between the current and the voltage has a constant value for all voltage values (i.e. is independent of voltage). It will be appreciated that for this linear relationship the ratio between the current and the voltage is the conductance of the load 10, i.e. the inverse of the impedance of the load 10.

The conductance is adjustable and is adjusted by the control circuit 14 supplying a control signal, referred to as a "trim value"-"TRIM_LINEAR"- to the adjustable linear load 10. The arrow seen in FIG. 3 represents an increase in the "trim value", therefore an increase in trim value (i.e. moving from the furthest right line on the graph to the line immediately to the left) corresponds to an increase in the gradient (ratio) of the linear relationship, i.e. making the device "stronger" since conductance is increased.

It will be understood that in reality the relationship between the current and the voltage may not be entirely linear. However, the load 10 can still be considered as an entirely linear device since the relationship is sufficiently linear within the range of voltage swing which is relevant for the device.

The minimum trim code is 0 for both devices. The maximum trim code is a design parameter which can be selected.

Figure 4:
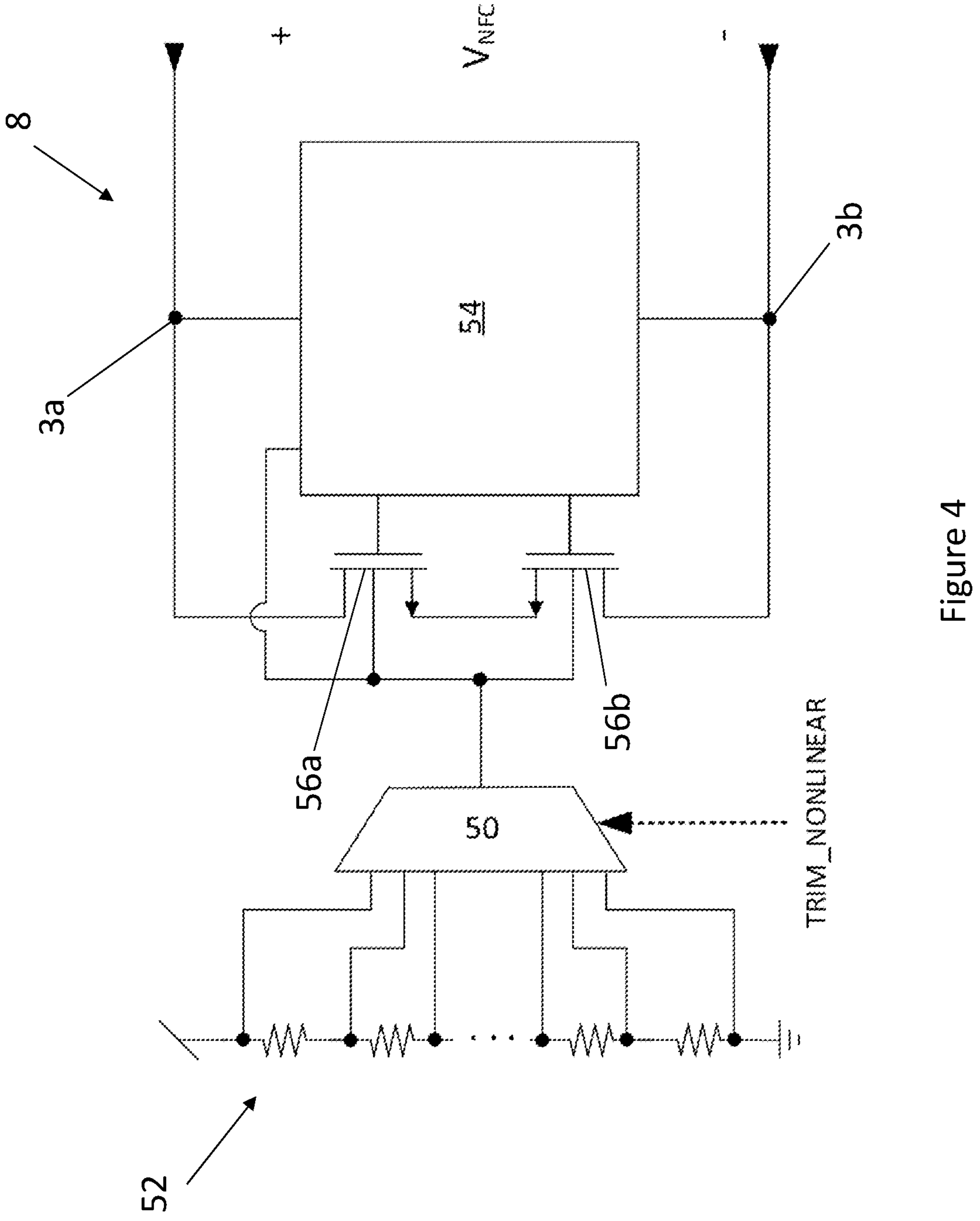
FIG. 4 is a schematic circuit diagram showing an example voltage clamp.

FIG. 4 is a schematic circuit diagram showing one simple way to implement the non-linear voltage clamp 8.

The voltage clamp includes a multiplexer 50, which receives the trim value TRIM_NONLINEAR from the control circuit 14. The multiplexer 50 is connected to a resistor ladder 52 from supply to ground, and the voltage of the resistor ladder 52 is selected by the multiplexer 50 based on TRIM_NONLINEAR.

The voltage clamp 8 also includes two large NMOS devices 56*a*, 56*b* connected between the antenna connection terminals 3*a*, 3*b*. These devices are quite large, so they can sink a lot of current if needed. The gate voltages to these devices are passively generated by stacks of diodes (implemented by diode-connected NMOS devices, not shown) and some resistors inside a "passive gate control" module 54. The effect of this is very non-linear IV characteristics, as represented in FIG. 2. As a result the clamp will start to sink significant current if $V_{NFC}$ goes above the "clamping voltage" $V_{clamp}$ of the diode stack, thus clamping the voltage. This is all completely passive.

The voltage generated by the resistor ladder 52 is supplied to the back-gate/bulk of each of the NMOS devices 56*a*, 56*b* in order to "trim" the voltage clamp. Increasing the back-gate/bulk voltage means that the current will increase through all the devices inside the voltage clamp 8, including the large NMOS devices 56*a*, 56*b* and the diodes inside the "passive gate control" module 54.

Figure 5:
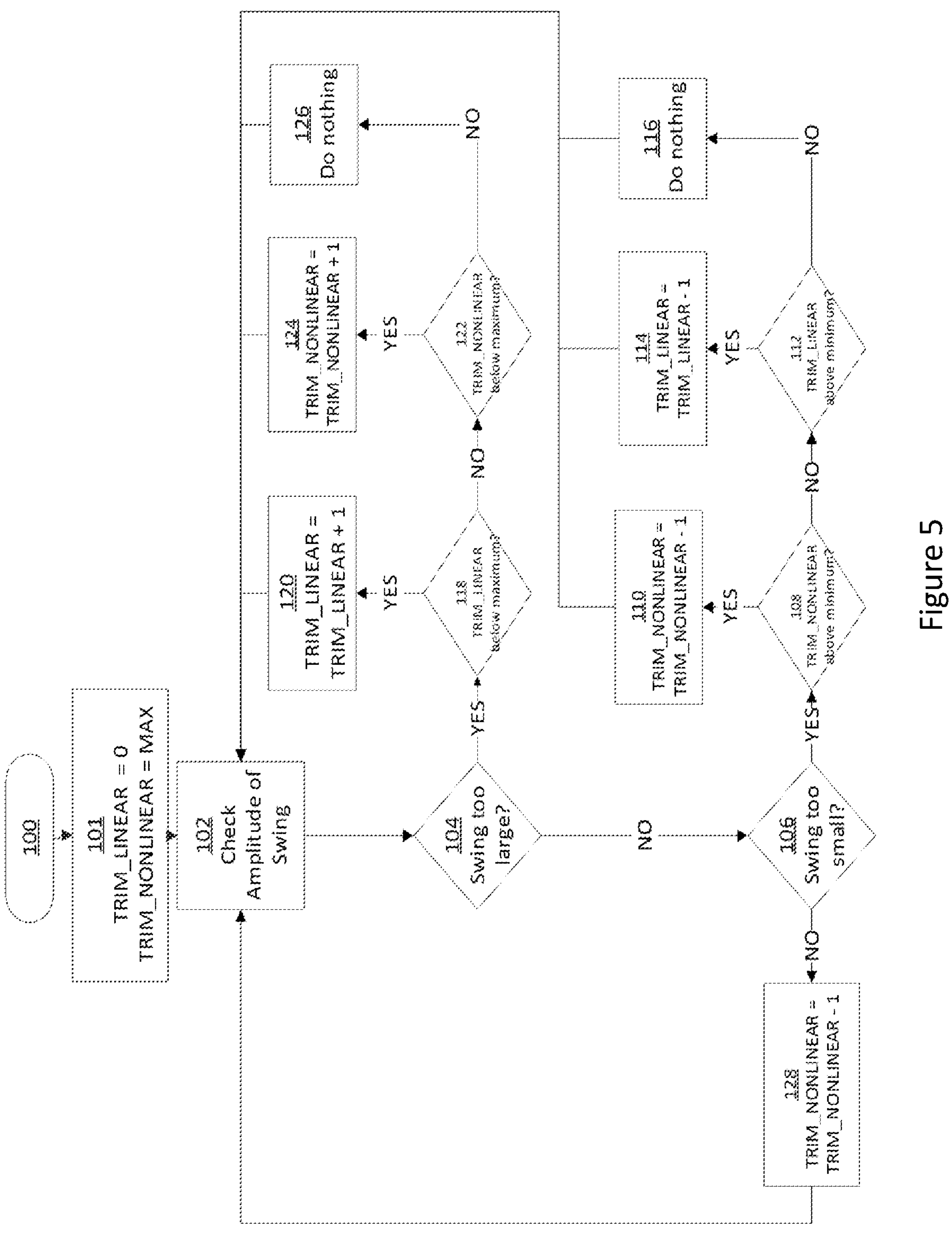
FIG. 5 is a flow diagram showing a method for regulating the voltage swing across the antenna of an NFC receiver according to an embodiment of the present invention.

FIG. 5 is a flow diagram showing a method for regulating the voltage swing across the antenna of an NFC receiver according to an embodiment of the present invention. The method begins at step 100, at which the Listener device 1 wakes up. Before wake-up, the Listener device 1 is in a "sense"-mode where it senses for a field. This mode is "always-on" and in this mode a minimum amount of current is drawn. When a field is detected, then the Listener device 1 wakes-up and NFC communication can start.

The effect of the method described below can also be seen with reference to FIG. 6, which is a graph representing an example progression of the value of $V_{NFC}$ of the Listener device 1 as the method steps shown in FIG. 5 are applied. It will be understood that this graph shows only the positive voltage swing, relative to the common mode signal (i.e. y=0). There is also a negative voltage swing value mirrored about the x-axis, which is not shown in FIG. 6. At time 200 as seen on the graph of FIG. 6 an external NFC field is suddenly applied, causing the voltage across the antenna 2 $V_{NFC}$ to rise rapidly.

The method of the present invention helps to ensure that the voltage clamp 8 has a maximal trim code (i.e. a low clamping voltage) during, and shortly after wake-up 100, since the non-linear relationship of the load provides good protection of the Listener device 1 (as described above), whilst the adjustable linear load 10 has minimum trim code (and therefore a small conductance, giving a small ratio between voltage and current, so that it draws a low current). This protection is particularly important for the Listener device 1 before and during the wake-up step 100 because as seen in FIG. 6 the strong field appears suddenly at the antenna 2, and the adjustable voltage clamp 8 needs to absorb all this current whilst keeping the voltage at safe levels.

Therefore, at initial step 101, the trim code of the linear load, TRIM_LINEAR, is set to 0 (i.e. its minimum value), whilst the trim code of the non-linear load, TRIM_NONLINEAR, is set to its maximum value, represented as MAX. As explained above, the maximum trim code value of each load is a design parameter which can be selected during design. As seen on the graph of FIG. 6, the voltage clamp 8 prevents the voltage swing from rising above $V_{clamp}$, where $V_{clamp}$ is a relatively low voltage value because the value TRIM_NONLINEAR is set to a maximum value. This clamping phase 202 protects the Listener device 1 by preventing the voltage swing from becoming too high. In this case, the clamping voltage is much lower than the voltage swing required for good modulation/demodulation, but the voltage is still enough to wake-up the tag.

After the initial wake-up phase 100, the method then seeks to decrease the trim code to the voltage clamp 8 (i.e. raise the clamping voltage), while trying to increase the trim code to the adjustable linear load 10 (i.e. increase the conductance of the linear load) in order to provide regulation.

A specifically linear relationship is beneficial since it improves the demodulation performance since the conductance (i.e. the selected ratio between current and voltage) stays constant, regardless of the swing. In contrast, for the non-linear load (e.g. the voltage clamp), the conductance will rapidly decrease when the swing drops and therefore the bandwidth of the Listener device 1 will drop significantly (since it is approximately proportional to the conductance). This will in most cases make demodulation impossible. The end goal is that the voltage clamp 8 should be as "weak" as possible (i.e. the lowest trim value, giving the highest clamping voltage), while the adjustable linear load should be as "strong" as possible (i.e. the highest trim value, giving the highest conductance). This is achieved by following the flow chart steps discussed below.

At step 102, the amplitude of the voltage swing is checked using the peak detector 12 and this voltage swing is sent to the control circuit 14.

Generally, the aim of the voltage swing regulation portion 6 is to regulate the voltage swing across the antenna connection terminals 3*a*, 3*b* so as to keep the voltage swing between a minimum voltage threshold $V_{min}$ and a maximum voltage threshold $V_{max}$.

Figure 6:
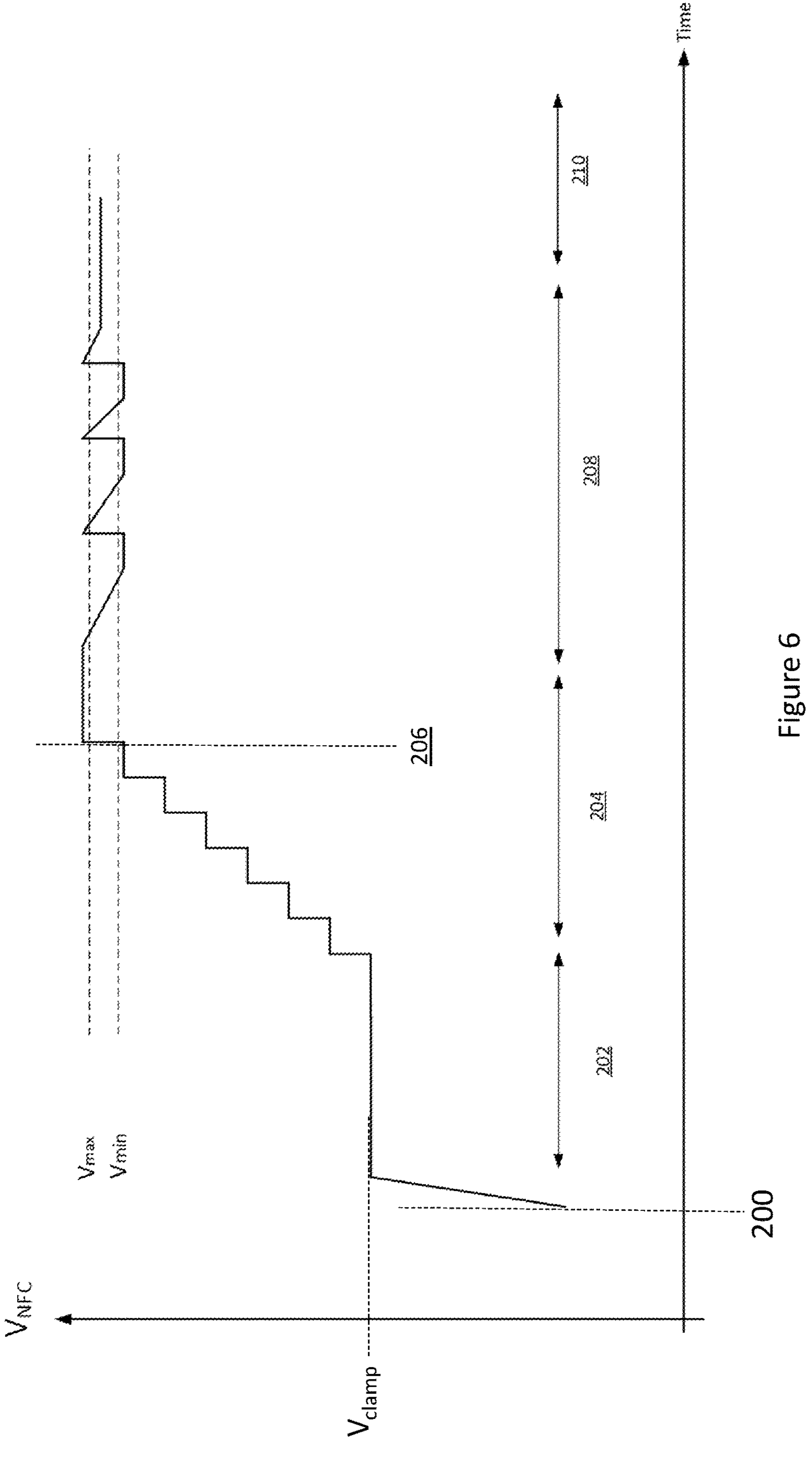
FIG. 6 is a graph representing an example progression of the value of $V_{NFC}$ of the electronic device of FIG. 1, as the method steps shown in FIG. 5 are applied.

These thresholds are shown on the graph of FIG. 6. These threshold voltages are adjustable ("trimmable") and can be set to a wide range of voltages.

At step 104 it is determined by the control circuit 14 whether the voltage swing is larger than the maximum voltage threshold, $V_{max}$, supplied from the reference generator.

Generally, following wake-up, the voltage swing will not exceed $V_{max}$ (as it will be clamped at a much lower value). When $V_{max}$ is not exceeded, the method proceeds to step 106, where it is determined by the control circuit 14 whether the voltage swing is smaller than the minimum voltage threshold, $V_{min}$.

If the voltage swing is below $V_m$ in, as is generally the case immediately following wake-up, then the method proceeds to step 108, at which point it is checked whether the value of TRIM_NONLINEAR is above the minimum value. This corresponds to the clamping voltage being below its maximum value. If it is, then step 110 is carried out, in which the value of TRIM_NONLINEAR is reduced, i.e. decremented, by one, thereby increasing the clamping voltage. This would be represented by shifting the curve in FIG. 2 rightwards The method then repeats, returning to step 102. Whilst the outcomes of each step remain the same, the same series of steps is repeated, with the value of TRIM_NONLINEAR being reduced by one each time, thus allowing the voltage swing $V_{NFC}$ to gradually increase since the clamping voltage is raised, as seen at stage 204 of FIG. 6.

If a minimum value of TRIM_NONLINEAR (i.e. the maximum clamping voltage) is reached before the voltage swing exceeds $V_m$ in, then the method proceeds to step 112, in which it is checked whether the value of TRIM_LINEAR is above the minimum value for TRIM_LINEAR. If it is, then the value of TRIM_LINEAR is decreased by one, at step 114. Otherwise, no action is taken (step 116), since although the voltage swing is too small, neither of the trim values can be reduced.

Generally, at some point after the trim values have been reduced, $V_{NFC}$ begins to exceed $V_{max}$, as shown at time 206 in FIG. 6. When the swing exceeds $V_{max}$, following a check at step 102, the method proceeds to step 118, where it is checked whether the value of TRIM_LINEAR is below its maximum value, i.e. whether the conductance for the linear load is at its maximum value. If it is below its maximum value then the value of TRIM_LINEAR is increased, i.e. incremented, by one, at step 120, this causes the adjustable linear load 10 to draw a greater current for the same voltage value, since the conductance is changed. This represents a desirable use of the linear load to provide the necessary regulation.

Alternatively, if TRIM_LINEAR is already at its maximum value, then the method proceeds to step 122 and checks whether TRIM_NONLINEAR is below its maximum value (i.e. whether the clamping voltage is above its minimum value). If it is, then TRIM_NONLINEAR is increased by one at step 124, thus lowering the clamping voltage, whereas if TRIM_NONLINEAR is already at its maximum value then no action is taken, as shown at step 126. This represents the situation where it is necessary to use the non-linear clamp to provide more of the required regulation as the linear load is not able to provide this fully.

If steps 104 and 106 determine that the voltage $V_{NFC}$ is between $V_{min}$ and $V_{max}$ then the method proceeds to step 128, in which the value of TRIM_NONLINEAR is decreased by 1, raising the clamping voltage. This may of course result in $V_{NF}$C rising up above $V_{max}$, in which case TRIM_LINEAR will then be increased in the next cycle of the method (since the method will arrive at step 120). However, this is preferably avoided. The voltage swing may typically change by 50-70 mV for each change in trim code, thus allowing the voltage to be "stepped up" giving the stair-like shape seen in FIG. 6, and helping to avoid the voltage swing exceeding $V_{max}$ (at least by a large amount). Thus, over time, in the phase 208 of FIG. 6, the non-linear voltage clamp 8 is made "weaker" and the linear load 10 is made "stronger" by the method of the flow diagram repeating many times, until a steady state is reached in stage 210.

Ideally in this state the value of TRIM_NONLINEAR is zero, so that the clamp voltage has its maximum possible value. However, this may not be possible depending on the voltage swing, particularly if the linear load 10 is insufficient to keep the voltage swing within the desired range, in which case there will be some oscillations in the trim code over time. Preferably the linear load 10 is able to provide a sufficiently high conductance, i.e. low enough impedance, so that the trim code of the voltage clamp can be brought down to zero. The value of TRIM_LINEAR may not be at its maximum value, but rather will have the highest value which still maintains the voltage swing between the values $V_{min}$ and $V_{max}$.

The invention claimed is:

1. An electronic device for processing near-field communication signals, the electronic device comprising:

first and second antenna connection terminals for connection to a near-field antenna;

a linear load connected between said first and second antenna connection terminals, wherein a current flowing through the linear load has a substantially linear, positive relationship with a voltage across the linear load, defining a conductance of the linear load, wherein the conductance of the linear load is adjustable;

a voltage clamp connected between said first and second antenna connection terminals, having an adjustable clamping voltage;

a peak detector arranged to detect an amplitude of an incoming near-field communication signal across said antenna connection terminals; and a control circuit arranged to adjust the conductance of the linear load and the clamping voltage of the voltage clamp based on the amplitude detected by the peak detector, so as to regulate the voltage swing across the antenna connection terminals.

2. The electronic device of claim 1, wherein the control circuit is arranged to adjust the conductance of the linear load from a first minimum value, towards a first maximum value.

3. The electronic device of claim 1, wherein the control circuit is arranged to adjust the clamping voltage of the voltage clamp from a second minimum value, towards a second maximum value.

4. The electronic device of claim 1, wherein the electronic device further comprises a reference generator, arranged to generate a minimum voltage threshold and a maximum voltage threshold, wherein the control circuit is arranged to compare the detected amplitude to the minimum voltage threshold and to the maximum voltage threshold.

5. The electronic device of claim 1, wherein the voltage clamp comprises a multiplexer and a resistor ladder, arranged such that upon receipt of a control signal from the control circuit, the multiplexer controls the resistor ladder based on the received control signal.

6. The electronic device of claim 1, wherein the electronic device is an NFC-A Listener device.

7. A method of regulating voltage swing across an antenna of an electronic device receiving near-field communication signals, the method comprising:

detecting an amplitude of an incoming near-field communication signal across said antenna;

based on the detected amplitude:

adjusting a conductance of a linear load connected between first and second antenna connection terminals, said conductance providing a substantially linear, positive relationship between a current flowing through the linear load and a voltage across the linear load; and adjusting a clamping voltage of a voltage clamp connected between said first and second antenna connection terminals;

so as to regulate the voltage swing across the antenna connection terminals.

8. The method of claim 7, wherein adjusting the conductance of the linear load comprises adjusting the conductance of the linear load from a first minimum value, towards a first maximum value.

9. The method of claim 7, wherein adjusting the clamping voltage comprises adjusting the clamping voltage of the voltage clamp from a second minimum value, towards a second maximum value.

10. The method of claim 7, further comprising comparing the detected amplitude to a maximum voltage threshold and comparing the detected amplitude to a minimum voltage threshold.

11. The method of claim 10, wherein adjusting the conductance of the linear load comprises adjusting the conductance of the linear load from a first minimum value, towards a first maximum value, and wherein adjusting the clamping voltage comprises adjusting the clamping voltage of the voltage clamp from a second minimum value, towards a second maximum value, the method further comprising:

if the detected amplitude exceeds the maximum voltage threshold, then:

if the conductance of the linear load is below the first maximum value, increasing the conductance;

or, if the conductance of the linear load is equal to the first maximum value, then:

if the clamping voltage of the voltage clamp is above the second minimum value, decreasing the clamping voltage; and otherwise, not adjusting either the conductance of the linear load or the clamping voltage of the voltage clamp.

12. The method of claim 10, wherein adjusting the conductance of the linear load comprises adjusting the conductance of the linear load from a first minimum value, towards a first maximum value, and wherein adjusting the clamping voltage comprises adjusting the clamping voltage of the voltage clamp from a second minimum value, towards a second maximum value, the method further comprising:

if the detected amplitude is below the minimum voltage threshold, then:

if the clamping voltage of the voltage clamp is below the second maximum value, increasing the clamping voltage;

or, if the clamping voltage is equal to the second maximum value, then:

if the conductance of the linear load is above the first minimum value, decreasing the conductance; and otherwise, not adjusting either the conductance value of the linear load or the clamping voltage of the voltage clamp.

13. The method of claim 10, further comprising:

if the detected amplitude is above the minimum voltage threshold and below the maximum voltage threshold, increasing the clamping voltage of the voltage clamp.

14. The method of claim 7, comprising repeatedly carrying out the steps of:

detecting the amplitude of the incoming near-field communication signal across said antenna;

based on the detected amplitude;

adjusting the conductance of the linear load connected between the first and second antenna connection terminals, said conductance providing a substantially linear, positive relationship between a current flowing through the linear load and a voltage across the linear load; and adjusting the clamping voltage of the voltage clamp connected between said first and second antenna connection terminals;

so as to regulate the voltage swing across the antenna connection terminals.

15. The method of claim 7, comprising adjusting the conductance in increments of equal size.

* * * * *